(12) United States Patent
Yang et al.

(10) Patent No.: US 9,920,905 B2
(45) Date of Patent: Mar. 20, 2018

(54) LIGHT FIXTURE

(71) Applicant: Humanscale Corporation, New York, NY (US)

(72) Inventors: Zhaohui Yang, Saint Paul, MN (US); Gilles Jean-Baptiste Benoit, Saint Paul, MN (US); Gary H. Paulsen, Saint Paul, MN (US); Todd E. Bracher, Brooklyn, NY (US)

(73) Assignee: Humanscale Corporation, New York, NY (US)

( * ) Notice: Subject to any disclaimer, the term of this patent is extended or adjusted under 35 U.S.C. 154(b) by 111 days.

(21) Appl. No.: 15/056,619

(22) Filed: Feb. 29, 2016

(65) Prior Publication Data

US 2016/0178161 A1  Jun. 23, 2016

Related U.S. Application Data

(63) Continuation of application No. PCT/US2014/048418, filed on Jul. 28, 2014.

(60) Provisional application No. 61/871,955, filed on Aug. 30, 2013.

(51) Int. Cl.

| F21V 7/04 | (2006.01) |
|---|---|
| H01L 33/00 | (2010.01) |
| G02B 19/00 | (2006.01) |
| F21V 29/70 | (2015.01) |
| F21V 7/00 | (2006.01) |
| F21Y 115/10 | (2016.01) |

(52) U.S. Cl.
CPC ............ *F21V 7/043* (2013.01); *F21V 7/0008* (2013.01); *F21V 7/0091* (2013.01); *F21V 29/70* (2015.01); *G02B 19/0028* (2013.01); *G02B 19/0061* (2013.01); *F21Y 2115/10* (2016.08)

(58) Field of Classification Search
CPC .... F21V 7/0008; F21V 7/0025; F21V 7/0033; F21V 7/0091; F21V 7/04; F21V 7/041; F21V 7/043; F21V 13/00; F21V 13/02; F21V 13/04; F21V 13/06; F21V 13/12; F21V 13/14; F21V 29/70; G02B 6/00; G02B 6/0001; G02B 6/0005; G02B 6/0006; G02B 6/0008; G02B 6/0096; G02B 19/0028; G02B 19/0061
USPC ... 362/297–300, 304–305, 311.02, 327, 346, 362/551, 555, 600, 608–610, 612, 615, 362/623
See application file for complete search history.

(56) References Cited

FOREIGN PATENT DOCUMENTS

| DE | 102012213043 A1 | 1/2013 |
| EP | 2696226 A1 | 2/2014 |
| WO | 2007087710 A1 | 8/2007 |
| WO | 2008126023 A2 | 10/2008 |

(Continued)

OTHER PUBLICATIONS

PCT/US2014/048418, 3M Innovative Properties Company, EP as ISA, International Search Report and Written Opinion, dated Dec. 11, 2014, 10 pages.

*Primary Examiner* — Jason Moon Han
(74) *Attorney, Agent, or Firm* — Jones Walker LLP

(57) ABSTRACT

The present disclosure describes a light fixture for general lighting. The light fixture is includes a light source assembly that uses a point source of light such as an LED, an aspheric reflector, and a lightguide made of transparent materials, that redirects and distributes the light from the point source to an area light. The novel light fixture is not only functional and provides low-glare illumination, it also has an aesthetically pleasing appearance.

14 Claims, 12 Drawing Sheets

(56) References Cited

FOREIGN PATENT DOCUMENTS

WO 2010079439 A1 7/2010

LIGHT FIXTURE

CROSS REFERENCE TO RELATED APPLICATIONS

This application is a continuation of PCT/US2014/048418 filed on Jul. 28, 2014, which claims the benefit of U.S. Provisional Application No. 61/871,955 filed on Aug. 30, 2013, each incorporated by reference herein in its entirety.

BACKGROUND

High brightness light emitting diodes (LEDs) have the benefits of high efficiency, small form factor, broad choice of spectrum, and long lifetime. However LEDs generally cannot be a lighting unit by themselves, in part due to their point-source nature, produced glare, and aesthetics. Secondary optics, such as lenses and diffusers, are commonly used to transform high brightness LEDs into a comfortable light source for the user. A separate housing unit is often used to enclose the illumination core, to further control the emission, directionality, and quality of the light. Light fixtures using LEDs thus typically require several components, in addition to the LEDs, to function as a complete lighting unit. Accordingly, a need exists for improved and more versatile luminaires incorporating LEDs or other solid state light sources.

SUMMARY

The present disclosure provides a novel light fixture, in which the housing unit is a lightguide made of transparent materials such as glass or clear plastic, and serves the function of light redirection and transformation from a point source to an area source. The novel light fixture is not only functional and provides low-glare illumination; it also has an aesthetically pleasing appearance. In one aspect, the present disclosure provides a light fixture that includes a lightguide having a top surface and an opposing bottom surface, and a light source. The top surface includes a primary reflector cavity surrounding a central axis; an annular input surface disposed facing the primary reflector cavity; and an annular first reflector surface adjacent the annular input surface. The light source is disposed along the central axis and adjacent a primary reflector within the primary reflector cavity. Light rays from the light source reflect from the primary reflector, refract through the annular input surface, reflect from the annular first reflector surface, and are directed toward the opposing bottom surface of the lightguide.

In another aspect, the present disclosure provides a light fixture that includes a lightguide having a top surface and an opposing bottom surface, and a light source. The top surface includes a primary reflector cavity surrounding a central axis; an annular input surface disposed facing the primary reflector cavity; and an annular first reflector surface adjacent the annular input surface. The light source is disposed along the central axis and adjacent a primary reflector within the primary reflector cavity. Light rays from the light source reflect from the primary reflector, refract through the annular input surface, reflect from the annular first reflector surface, and are directed toward the opposing bottom surface of the lightguide. The top surface further includes an annular second reflector surface adjacent the annular first reflector surface, positioned such that light rays reflect from the annular second reflector surface before reaching the opposing bottom surface of the lightguide.

In yet another aspect, the present disclosure provides a light fixture that includes a lightguide having a top surface and an opposing bottom surface, and a light source. The top surface includes a primary reflector cavity surrounding a central axis and an annular first reflector disposed facing the primary reflector cavity. The light source is disposed along the central axis and adjacent a primary reflector within the primary reflector cavity. Light rays from the light source reflect from the primary reflector, reflect from the annular first reflector, and are directed toward the opposing bottom surface of the lightguide.

In yet another aspect, the present disclosure provides a light fixture that includes a lightguide having a top surface and an opposing bottom surface, and a light source. The top surface includes a primary reflector cavity surrounding a central axis and an annular first reflector disposed facing the primary reflector cavity. The light source is disposed along the central axis and adjacent a primary reflector within the primary reflector cavity. Light rays from the light source reflect from the primary reflector, reflect from the annular first reflector, and are directed toward the opposing bottom surface of the lightguide. The top surface further includes an annular second reflector adjacent the annular first reflector, positioned such that light rays reflect from the annular second reflector before reaching the opposing bottom surface of the lightguide.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1A:
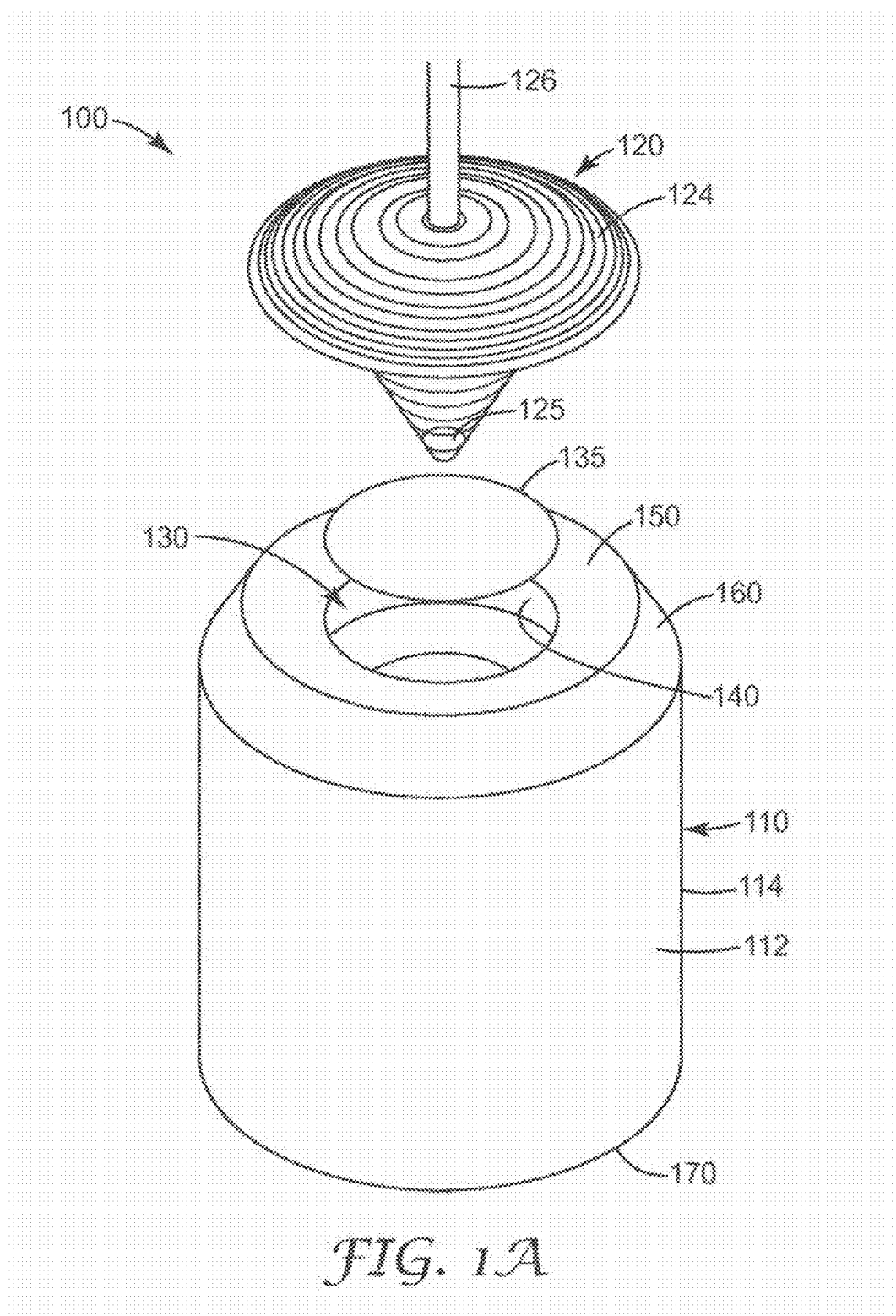
FIG. 1A shows an exploded perspective view of a light fixture.

The present disclosure describes a light fixture for general lighting. The light fixture is comprised of a light source assembly that uses a point source of light such as an LED, an aspheric reflector, and a lightguide, that redirects and distributes the light from the point source to an area light. The aspheric reflector immediately underneath the LED redirects and transforms the LED light into a ring distribution above the LED, which is then refracted and reflected within the lightguide to emerge as an area light.

In the following description, reference is made to the accompanying drawings that forms a part hereof and in which are shown by way of illustration. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

As used herein, when an element, component or layer for example is described as forming a "coincident interface" with, or being "on" "connected to," "coupled with" or "in contact with" another element, component or layer, it can be directly on, directly connected to, directly coupled with, in direct contact with, or intervening elements, components or layers may be on, connected, coupled or in contact with the particular element, component or layer, for example. When an element, component or layer for example is referred to as being "directly on," "directly connected to," "directly coupled with," or "directly in contact with" another element, there are no intervening elements, components or layers for example.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

As used herein, when an element, component, or layer for example is described as being "annular", it can be ring-like and includes an open central portion. "Annular" does not necessarily mean that the element, component, or layer is rotationally symmetric as in a circle, but instead can have any desired shape including circular, oval, or polygonal, and include planar regions as well as curved and complex-curved regions. Generally, "annular" elements, components, or layers include some symmetry about the central portion; however, symmetry is not required.

As used herein, the term "visible-light transmissive material" means a component or material through which light that can generally be perceived by the human eye can be transported. In some cases, the component or material may also exhibit extremely low absorption, scattering, or dispersion of light, although this may not be required. In some cases, the component or material may have absorption, scattering, or dispersion adjusted to provide desired optical effects that are either visible within the component or material, or visible in light patterns emitted from the component. For example, in some cases the component or material may have a haze level of greater than 2% per inch, greater than 5% per inch, or even greater than 10% per inch. In some cases, the component or material may also include optional colorants, fluorescers, wavelength down-converting elements, and the like, which do not detract from the use of the phrase "visible-light transmissive".

FIG. 1A shows an exploded perspective view of a light fixture 100, according to one aspect of the disclosure. Light fixture 100 includes a lightguide 110 and a light source 120. The lightguide 110 can be made from any suitable visible-light transmissive material 112 including, for example, plastics such as acrylic or polycarbonate, minerals such as quartz, and optical glasses such as Schott BK7 borosilicate glass and the like. The lightguide 110 can have any desired cross-sectional shape, including, for example, a cylinder, an oval, a triangle, a rectangle, or any desired curved or polygonal shape, and can be hollow or solid. In the description that follows, reference is made to a cylindrical cross-section lightguide that is rotationally symmetric about a central axis; however, it is to be understood that the various elements and components can readily be adapted to other cross-sectional shapes by one of skill in the art.

The lightguide 110 has a top surface, an opposing bottom surface 170, and an exterior surface 114 disposed between the top surface and the opposing bottom surface 170. The top surface includes a primary reflector cavity 130, an annular input surface 140 disposed facing the primary reflector cavity 130, an annular first reflector surface 150 adjacent the annular input surface 140, and an optional annular second reflector surface 160 adjacent the annular first reflector surface 150.

A primary reflector 135 is disposed in the primary reflector cavity 130. In some cases, the primary reflector 135 can be a metallic layer, a metal alloy layer, or a multilayer dielectric reflector layer, deposited directly on the lightguide 110 in the primary reflector cavity 130. For example, the primary reflector cavity 130 can be suitably shaped, molded, machined, and polished, and the metallic or dielectric layer(s) of the primary reflector 135 can be deposited by techniques including, for example, sputtering, vapor deposition, plating, and the like. In some embodiments, the reflectivity of the primary reflector 135 can be greater than 90%, or greater than 95%, or greater than 98%, or even greater than 99% in the visible-light spectrum. Generally, a higher reflectivity is preferred.

In some cases, the primary reflector 135 can instead be formed from a metal plate or sheet, a metal alloy plate or sheet, a metal or metal alloy coated polymeric film, or a multilayer dielectric reflector, either by direct machining, compression and/or thermal forming the sheet, or other techniques known to one of skill in the art. In one particular embodiment, thermal formed polymeric multilayer reflector film, such as Vikuiti™ ESR film, available from 3M Company, can be a preferred primary reflector 135. In general, the primary reflector 135 and the lightguide 110 can each be designed to have lower symmetry in the horizontal plane (e.g. isosceles triangle (3-fold), square (4-fold), pentagon (5-fold) . . . ) as desired, for design purposes.

The light source 120 includes a cable 126 that can be used for supplying electricity to the light source and also for suspending the light fixture 100 from a ceiling (not shown), a heat-sink 124 used for dissipating heat generated by a point light source 125. Although the point light source 125 can be any suitable small light source including, for example, a light emitting diode (LED), a high intensity discharge lamp, a halogen lamp, an incandescent lamp, and a compact fluorescent (CFL) lamp, an LED is preferred. Generally, the point light source 125 should be small relative to the size of any reflective elements within the light fixture 100. The light source 120 can be releasably attached to the lightguide 110, as described elsewhere. As used herein, the point light source 125 is referred to as LED 125.

Figure 1B:
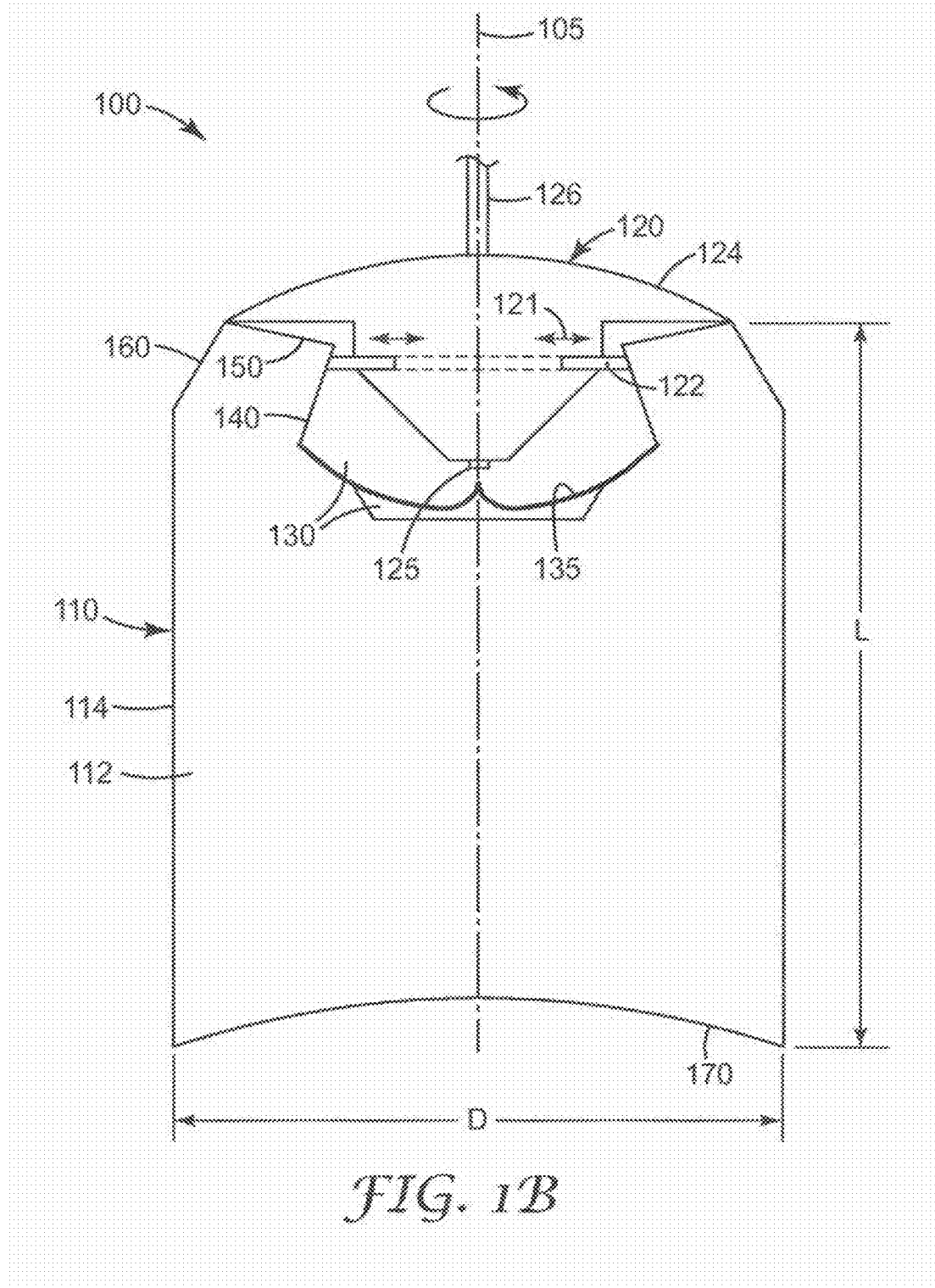
FIG. 1B shows a cross-sectional view of a light fixture.

FIG. 1B shows a cross-sectional view of a light fixture 100 through a central axis 105, according to one aspect of the disclosure. Each of the elements 100-170 shown in FIG. 1B correspond to like-numbered elements 100-170 shown in FIG. 1A, which have been described previously. For example, primary reflector 135 of FIG. 1B corresponds to primary reflector 135 of FIG. 1A, and so on.

Light fixture 100 includes a lightguide 110 and a light source 120. The lightguide 110 can be rotationally symmetric around a central axis 105, as described elsewhere, and can have any desired diameter "D" and any desired length "L" ranging from, for example, a few centimeters to several meters in length or more. The lightguide 110 has a top surface, an opposing bottom surface 170, and an exterior surface 114 disposed between the top surface and the opposing bottom surface 170. In some cases, the length "L" and/or the diameter "D" can be adjusted as desired to provide different patterns of illumination that exit from the opposing bottom surface 170, for example patterns that may be visible by projection on a surface placed proximate the opposing bottom surface 170. In some cases, the length "L" and/or the diameter "D" can also be adjusted as desired to provide different patterns of illumination that are visible within the lightguide 110, for example patterns that may be visible viewing the lightguide 110 in a darkened room, through the exterior surface 114 that extends along the central axis 105. In some cases, these interior patterns may be made more visible by adjusting the scattering, dispersion, or absorption of the material, or by the addition of optional colorants, fluorescers, wavelength down-converting elements, and the like, as described elsewhere.

The top surface includes a primary reflector cavity 130, an annular input surface 140 disposed facing the primary reflector cavity 130, an annular first reflector surface 150 adjacent the annular input surface 140, and an optional annular second reflector surface 160 adjacent the annular first reflector surface 150. Each of the annular input surface 140, annular first reflector surface 150, and an optional annular second reflector surface 160 can be surfaces that are generated by rotation of a line segment around the central axis 105. In some cases (not shown), each of the annular input surface 140, annular first reflector surface 150, and an optional annular second reflector surface 160 can be instead be surfaces that generated by rotating a piecewise line, a curve, or a piecewise curve, or a combination thereof, about the central axis to form the annular shape, as described elsewhere.

Each of the annular input surface 140, annular first reflector surface 150, and an optional annular second reflector surface 160 can be polished surfaces that can support total internal reflection (TIR). In some cases, the annular first reflector surface 150 and/or the optional annular second reflector surface 160 can include a reflective coating, film, or layer instead of relying on TIR for reflection; however, TIR is preferred. The reflective coating, film, or layer, if used, can be any of those reflectors described elsewhere, and can be directly deposited on the respective surface, or laminated or adhered to the surface. In one particular embodiment, the annular input surface 140 can further include an anti reflection coating.

A primary reflector 135 is disposed in the primary reflector cavity 130. The primary reflector 135 can be designed as desired to have a shape that is suitable for directing light into the lightguide 110 through the annular input surface 140. In one particular embodiment, the primary reflector 135 has a cusp-shape that converts the point source of LED 125 to a ring-shaped light that enters the annular input surface 140, as described elsewhere.

The light source 120 includes a cable 126, a heat-sink 124, and an LED 125. The light source 120 is disposed along the central axis 105 and placed adjacent the primary reflector 135 within the primary reflector cavity 130. The light source 120 further includes a mechanism 122 that can releasably attach the light source 120 to the lightguide 110, so that the pieces can be disassembled and serviced as desired without damage to the lightguide 110. In one particular embodiment, the mechanism 122 can be actuated by sliding motion 121 to expand against the annular input surface 140.

Figure 1C:
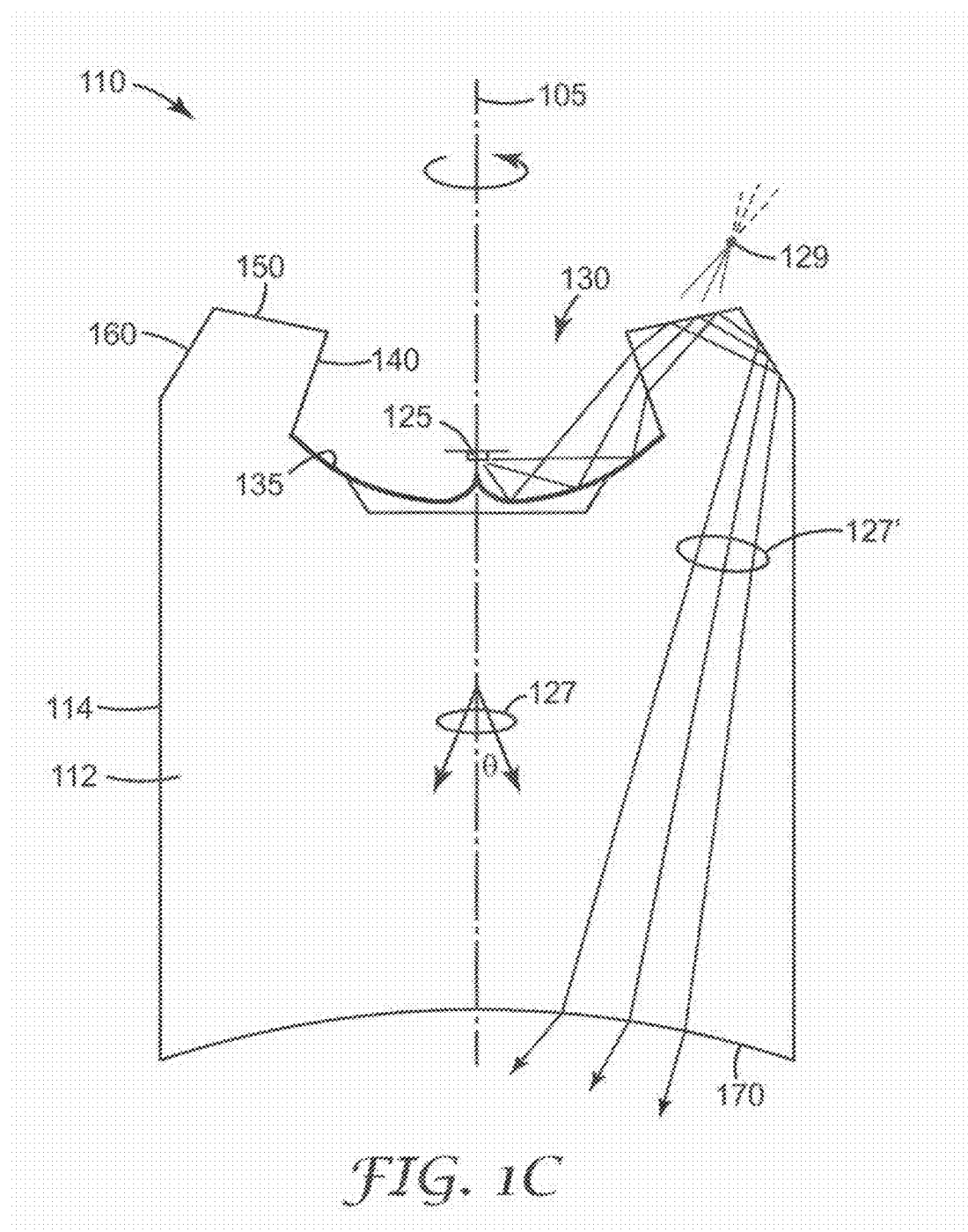
FIG. 1C shows a cross-sectional schematic view of a lightguide.

FIG. 1C shows a cross-sectional schematic view of a lightguide 110, according to one aspect of the disclosure. Each of the elements 100-170 shown in FIG. 1C correspond to like-numbered elements 100-170 shown in FIG. 1B, which have been described previously. For example, primary reflector 135 of FIG. 1C corresponds to primary reflector 135 of FIG. 1B, and so on. In FIG. 1C, the major portion of the light source 120 has been removed for clarity, and only LED 125 remains to trace the paths of light rays through lightguide 110. LED 125 emits light rays 127' that reflect from primary reflector 135 and enter lightguide 110 by refracting through annular input surface 140.

The light rays 127' then reflect from annular first reflector surface 150, reflect again from optional annular second reflector surface 160, and are directed toward opposing bottom surface 170. All of the transported light rays 127 that propagate through the lightguide 110 toward the opposing bottom surface travel within an angle such that TIR occurs at the exterior surface 114. The collection of transported light rays 127 can be described as a cone of light travelling within an $\theta$ of the central axis, where $\theta$ can range from about 0 degrees up to about 60 degrees, or 50 degrees, or 40 degrees, or 30 degrees, or 20 degrees, or up to about 15 degrees or less. The desired angular spread of light can be adjusted by design of the primary reflector 135, refractive index of the visible-light transmissive material 112, and the various angles at which each of the annular input surface 140, annular first reflector surface 150, and optional annular second reflector surface 160 make with the incident light rays.

In some cases, the primary reflector 135 can be designed such that light from LED 125 that reflects from primary reflector 135 is directed toward a virtual focus 129 that is positioned opposite the annular input surface. In some cases, such a reflector design can reduce the size of the area needed for each of the annular input surface 140, annular first reflector surface 150, and optional annular second reflector surface 160, as the light rays 127' are converging in the vicinity of the refractions and reflections, as known to one of skill in the art.

In one particular embodiment, the opposing bottom surface 170 can be used to modify the light travelling that exits the lightguide 110, by including features such as a lens, a plurality of lenslets, a plurality of facets, a diffuser, or a combination thereof. As shown in FIG. 1C, opposing bottom surface 170 includes a lens shape that can assist spreading the light as it leaves the lightguide 110.

Figure 1D:
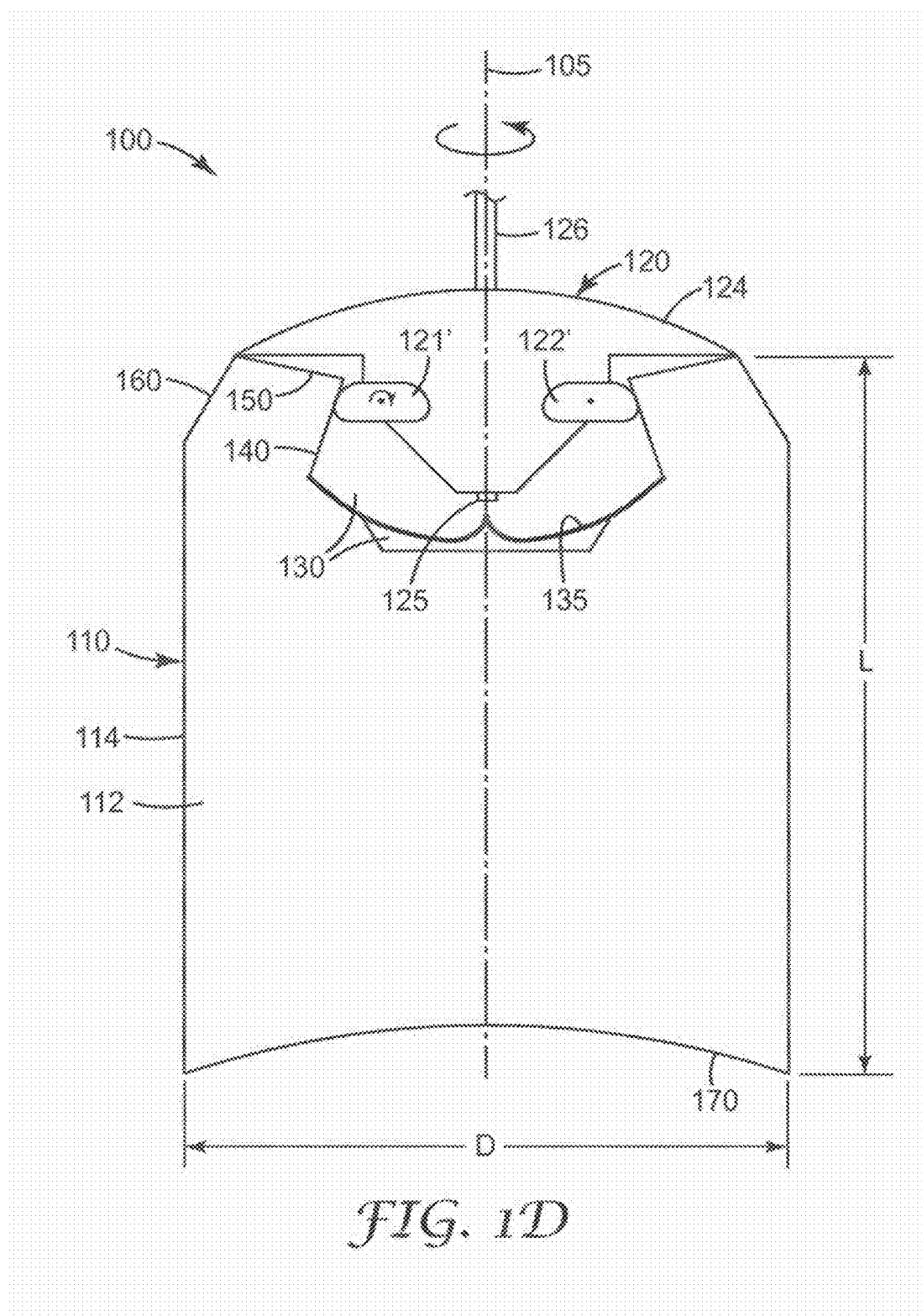
FIG. 1D shows a cross-sectional schematic view of a lightguide.

FIG. 1D shows a cross-sectional view of a light fixture 100 through a central axis 105, according to one aspect of the disclosure. Each of the elements 100-170 shown in FIG. 1D correspond to like-numbered elements 100-170 shown in FIG. 1B, which have been described previously. For example, primary reflector 135 of FIG. 1D corresponds to primary reflector 135 of FIG. 1B, and so on. In FIG. 1D, the light source 120 includes an alternative mechanism 122' that can releasably attach the light source 120 to the lightguide 110, so that the pieces can be disassembled and serviced as desired without damage to the lightguide 110. In one particular embodiment, the alternative mechanism 122' can be actuated by a pivoting motion 121' to expand against the annular input surface 140. The pivoting motion 121' can be actuated by a tightening mechanism such as a screw (not shown), within light source 120.

Figure 2A:
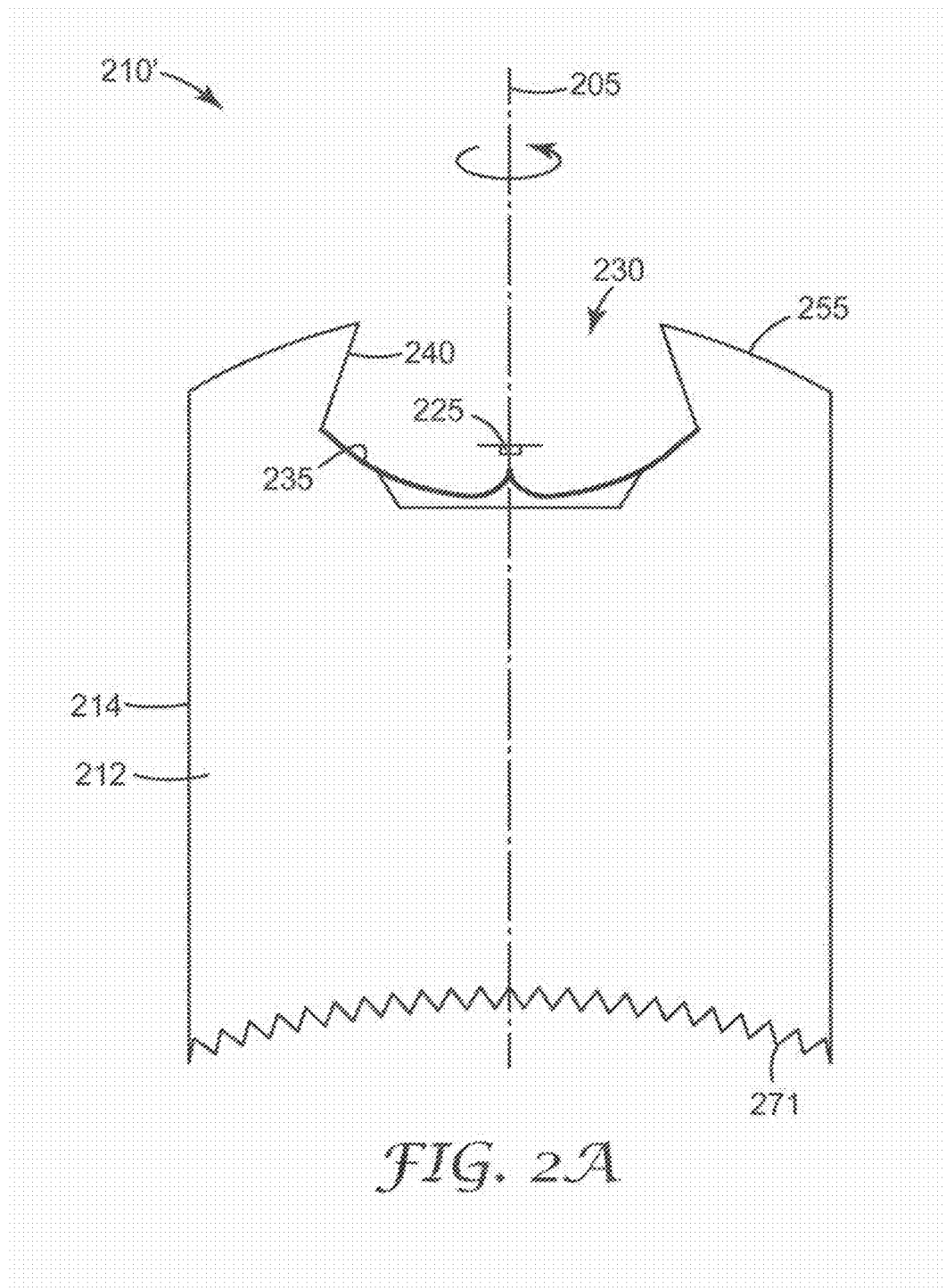
FIG. 2A shows a cross-sectional schematic view of a lightguide.

FIG. 2A shows a cross-sectional schematic view of a lightguide 210', according to one aspect of the disclosure. Each of the elements 205-240 shown in FIG. 2A correspond to like-numbered elements 105-140 shown in FIG. 1B, which have been described previously. For example, primary reflector 235 of FIG. 2A corresponds to primary reflector 135 of FIG. 1B, and so on. In FIG. 2A, an annular first curved reflector surface 255 is shown as an alternative to the annular first reflector surface 150 and optional annular second reflector surface 160. Annular first curved reflector surface 255 can be generated by rotating a curve around central axis 205, and can be designed such that light refracting while passing through annular input surface 240 then reflects from annular first curved reflector surface 255, and travels toward a faceted opposing bottom surface 271 in a manner similar to that shown in FIG. 1C.

Figure 2B:
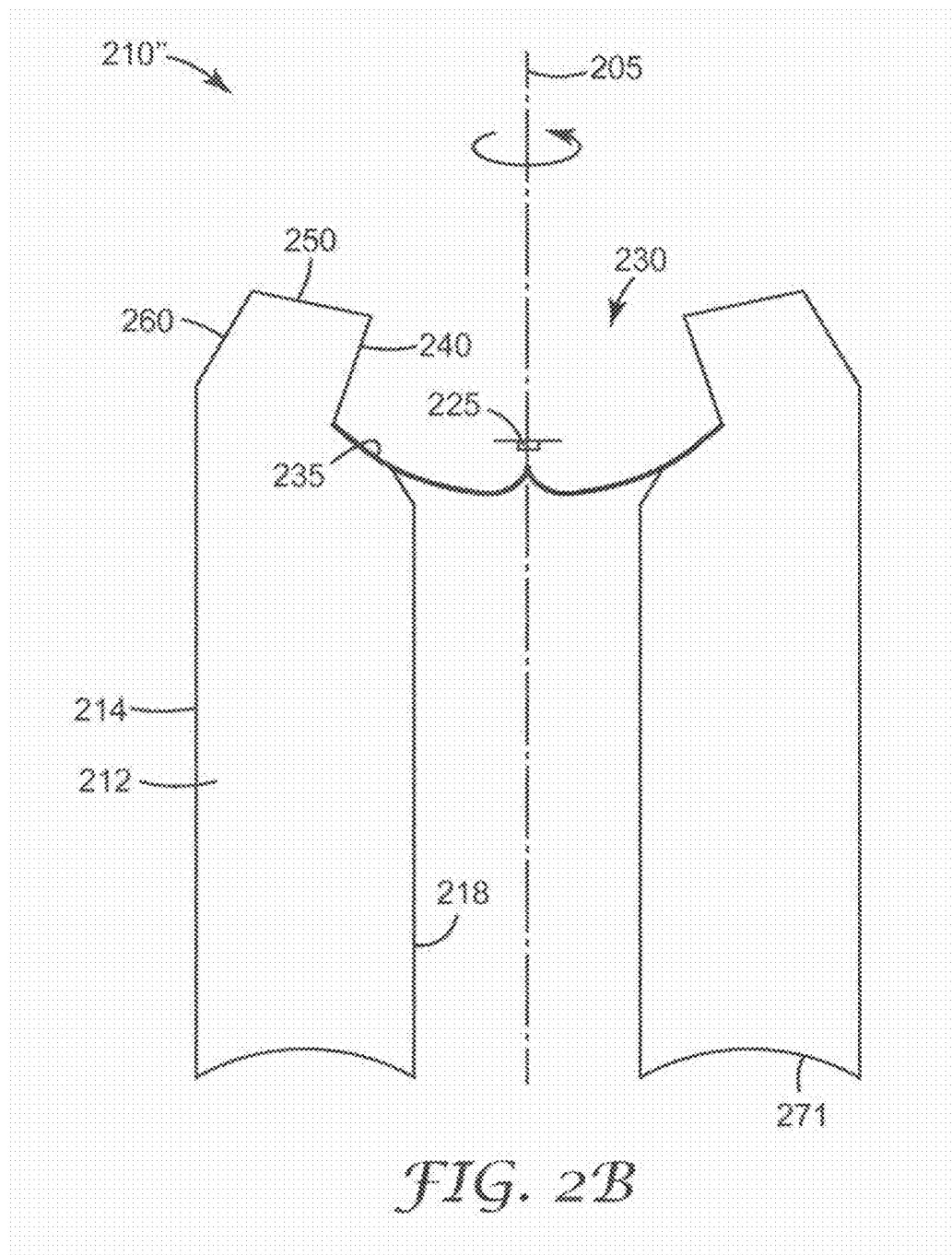
FIG. 2B shows a cross-sectional schematic view of a lightguide.

FIG. 2B shows a cross-sectional schematic view of a lightguide 210'', according to one aspect of the disclosure. Each of the elements 205-271 shown in FIG. 2B correspond to like-numbered elements 105-171 shown in FIG. 1B, which have been described previously. For example, primary reflector 235 of FIG. 2B corresponds to primary reflector 135 of FIG. 1B, and so on. In FIG. 2B, lightguide 210'' includes a hollow cylinder having a second exterior surface 218 as an alternative to the solid cylinder shown in FIGS. 1A-2A, and light from LED 225 travels through lightguide 210'' in a manner similar to that shown in FIG. 1C, but also includes TIR reflections from second exterior surface 218.

Figure 2C:
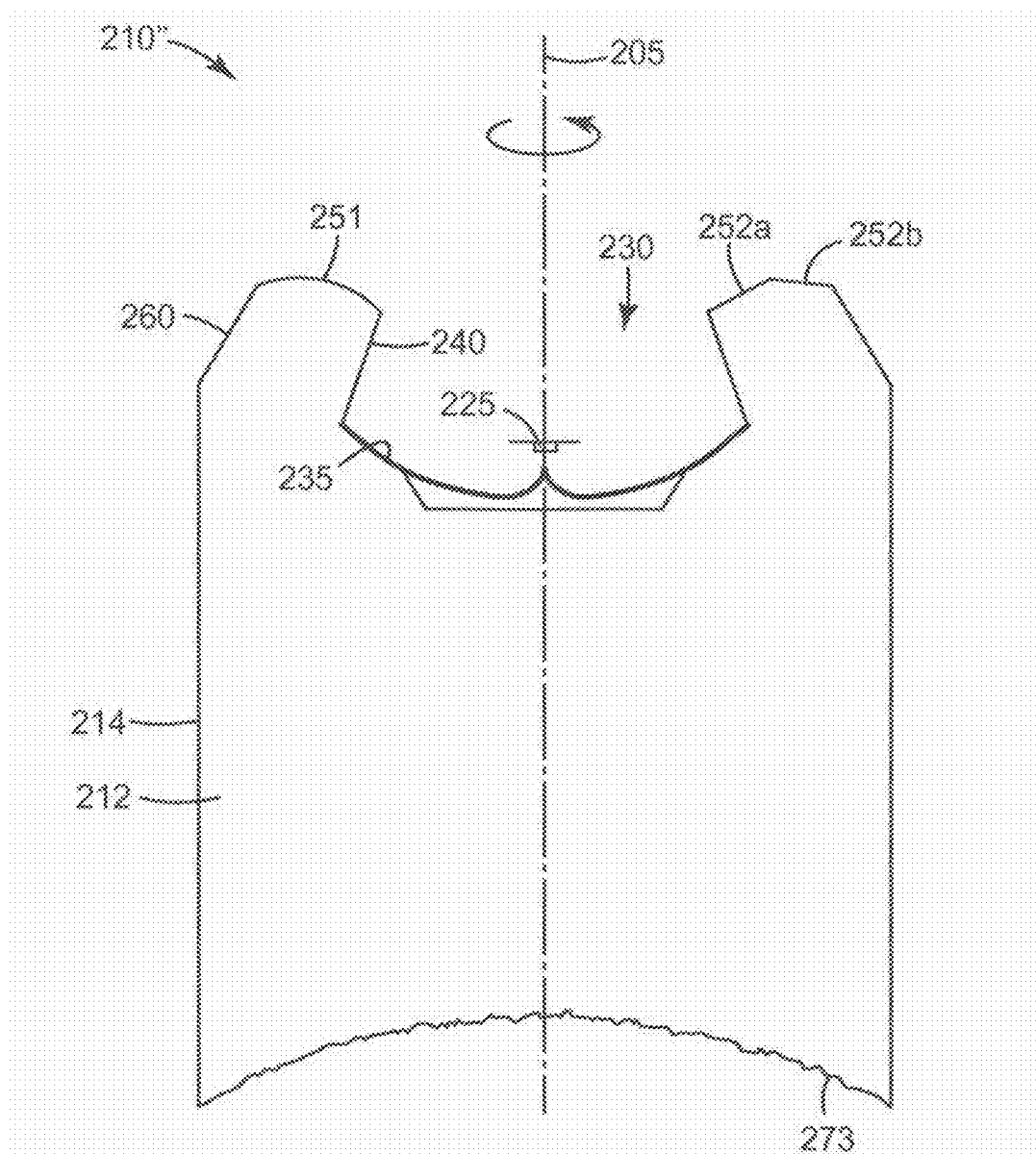
FIG. 2C shows a cross-sectional schematic view of a lightguide.

FIG. 2C shows a cross-sectional schematic view of a lightguide 210''', according to one aspect of the disclosure. Each of the elements 205-260 shown in FIG. 2C correspond to like-numbered elements 105-160 shown in FIG. 1B, which have been described previously. For example, primary reflector 235 of FIG. 2C corresponds to primary reflector 135 of FIG. 1B, and so on. In FIG. 2C, either annular first curved reflective surface 251 or annular first piecewise linear curved reflective surface 252a, 252b, are shown as alternatives to the annular first reflective surface 250 shown in FIGS. 1A-1C and 2B. Further, opposing bottom diffuse surface 273 can be used to modify the light that exits the lightguide 210'''.

Figure 2D:
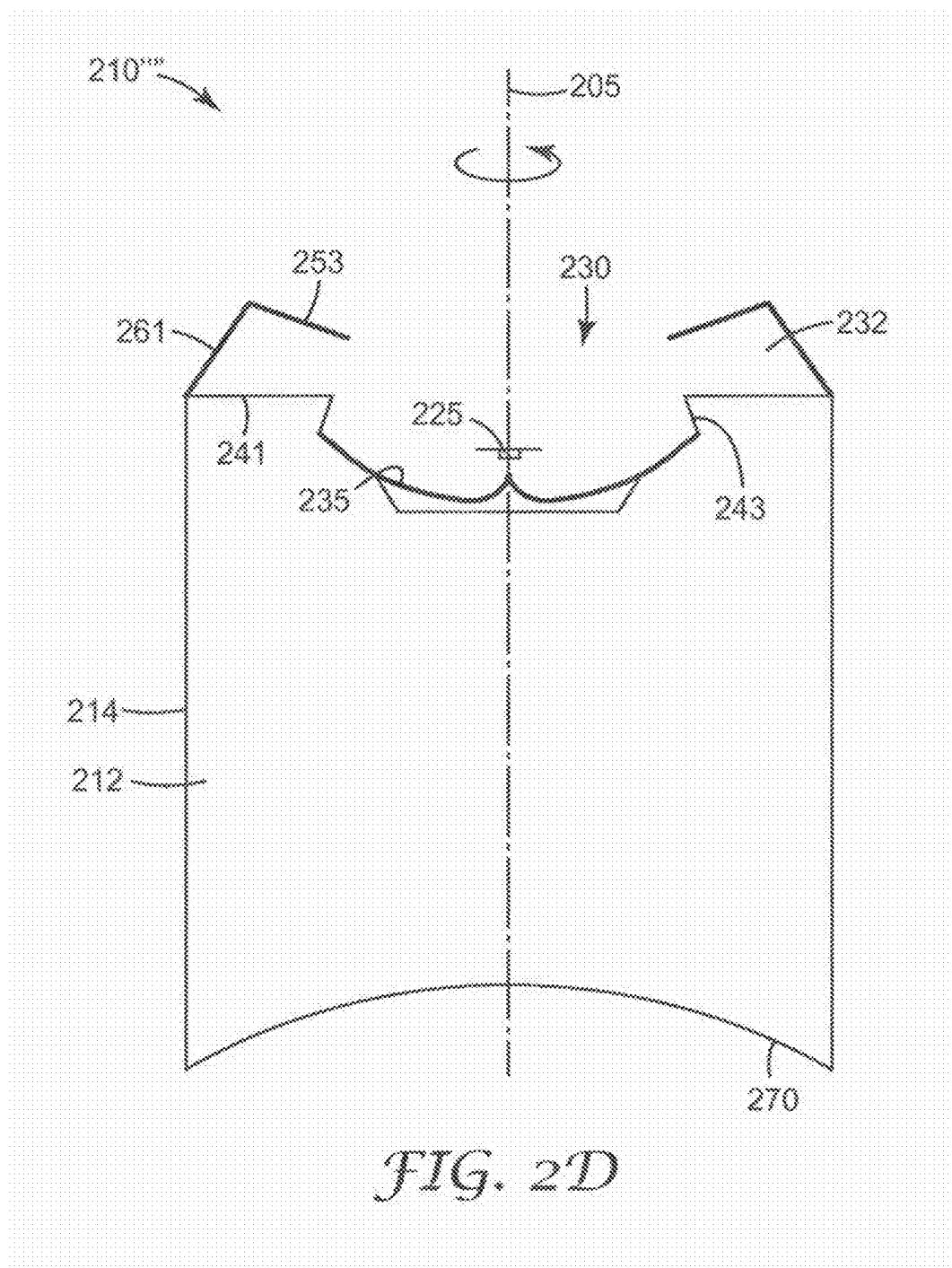
FIG. 2D shows a cross-sectional schematic view of a lightguide.

FIG. 2D shows a cross-sectional schematic view of a lightguide 210'''', according to one aspect of the disclosure. Each of the elements 205-270 shown in FIG. 2D correspond to like-numbered elements 105-170 shown in FIG. 1B, which have been described previously. For example, primary reflector 235 of FIG. 2D corresponds to primary reflector 135 of FIG. 1B, and so on. In FIG. 2D, the annular first reflector 253 and optional annular second reflector 261 replace the annular first reflector surface 150 and optional annular second reflector surface 160 of FIG. 1B, since the visible-light transmissive material 212 has been removed to enlarge the primary reflector cavity 230 by adding the open region 232. In this manner, light that reflects from the primary reflector 235 reflects from the annular first reflector 253 and optional annular second reflector 261 before refracting through annular input surface 241 and entering the lightguide 210''''. In one particular embodiment, annular first reflector 253 and optional annular second reflector 261 can be fabricated from a metal sheet or plate, and can be made reflective by any of the techniques described elsewhere. An optional flange 243 can be provided in the lightguide 210'''' to accommodate an attachment mechanism for the light source (not shown). In one particular embodiment, shown in FIG. 2D, the primary reflector 235 can be concave to the LED 225.

FIGS. 3A-3D show overhead schematic views of a lightguide, and are representative of the cross-sections that the lightguide can have. Although only four different cross-sections are represented in FIGS. 3A-3D, it is to be understood that any desired cross-section can be adapted as a lightguide including, for example, symmetric and asymmetric curved cross-sections; symmetric and asymmetric polygonal cross-sections; combinations of symmetric and/or asymmetric curved and/or polygonal cross-sections; cross-section sizes that increase, decrease, both increase and decrease, or remain the same along the distance from the top surface to the opposing bottom surface; cross-sections that are solid, uniformly hollow, non-uniformly hollow, or piecewise hollow; and the like.

Figure 3A:
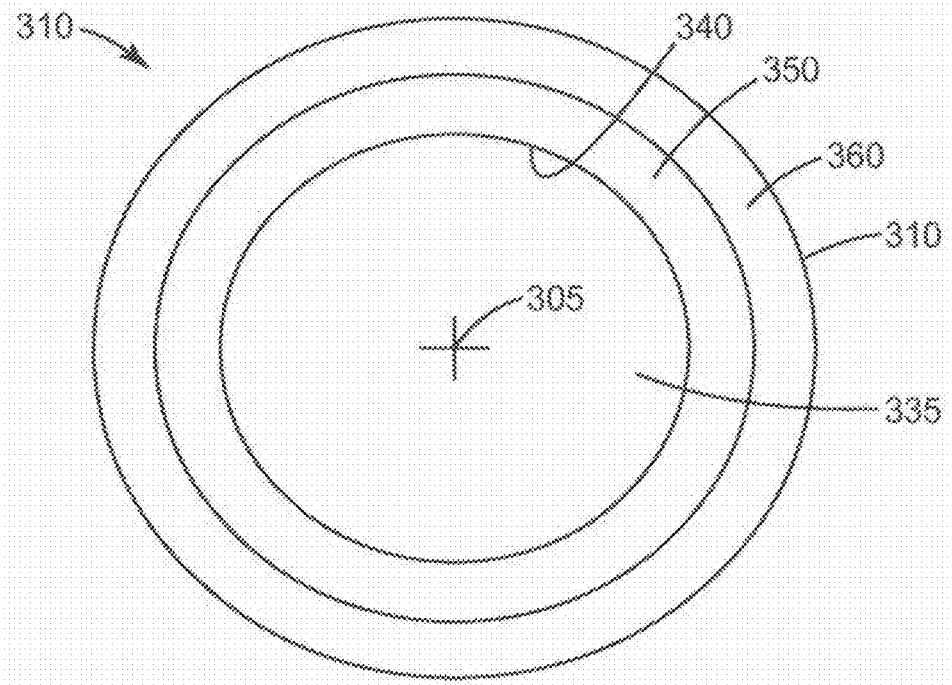
FIG. 3A shows an overhead schematic view of a lightguide.

FIG. 3A shows an overhead schematic view of a lightguide 310, according to one aspect of the disclosure. Each of the elements 305-360 shown in FIG. 3A correspond to like-numbered elements 105-160 shown in FIG. 1B, which have been described previously. For example, primary reflector 335 of FIG. 3A corresponds to primary reflector 135 of FIG. 1B, and so on. In FIG. 3A, lightguide 310 has a circular cross-section.

Figure 3B:
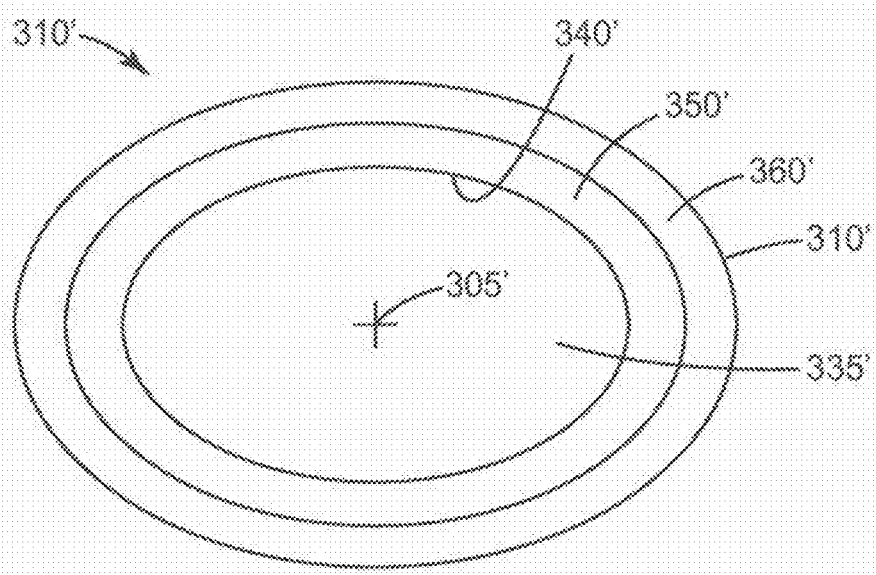
FIG. 3B shows an overhead schematic view of a lightguide.

FIG. 3B shows an overhead schematic view of a lightguide 310', according to one aspect of the disclosure. Each of the elements 305'-360' shown in FIG. 3B correspond to like-numbered elements 105-160 shown in FIG. 1B, which have been described previously. For example, primary reflector 335' of FIG. 3B corresponds to primary reflector 135 of FIG. 1B, and so on. In FIG. 3B, lightguide 310' has an oval cross-section.

Figure 3C:
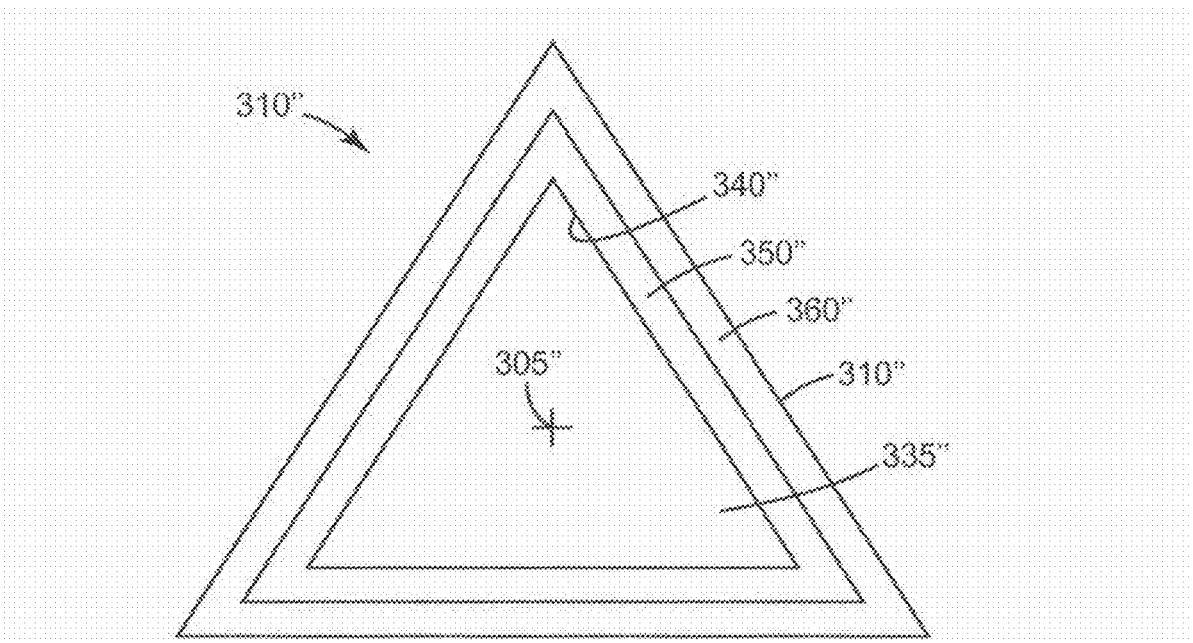
FIG. 3C shows an overhead schematic view of a lightguide.

FIG. 3C shows an overhead schematic view of a lightguide 310", according to one aspect of the disclosure. Each of the elements 305"-360" shown in FIG. 3C correspond to like-numbered elements 105-160 shown in FIG. 1B, which have been described previously. For example, primary reflector 335" of FIG. 3C corresponds to primary reflector 135 of FIG. 1B, and so on. In FIG. 3C, lightguide 310" has a triangular cross-section.

Figure 3D:
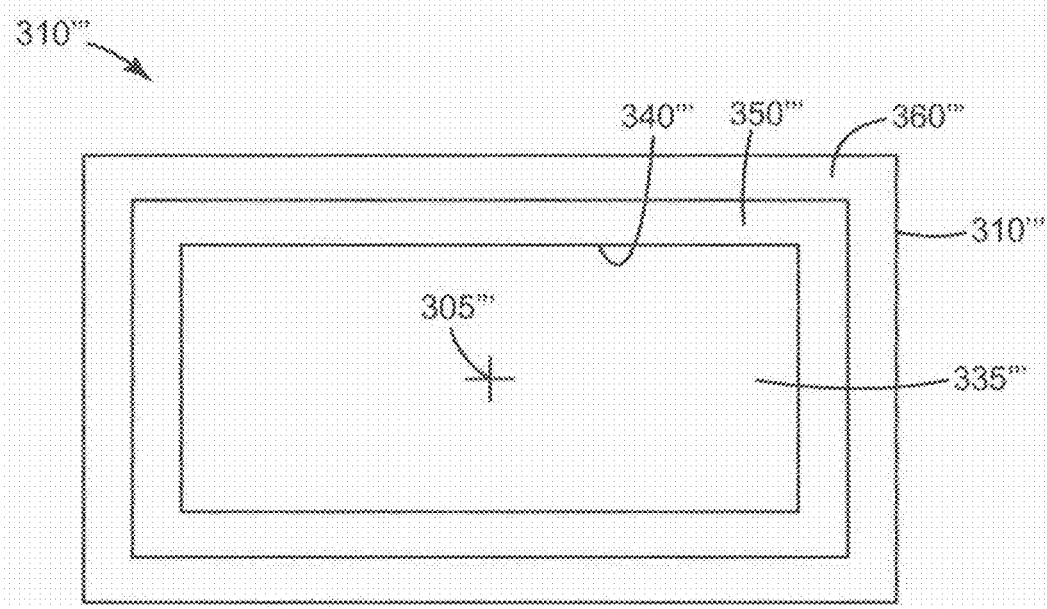
FIG. 3D shows an overhead schematic view of a lightguide.

FIG. 3D shows an overhead schematic view of a lightguide 310''', according to one aspect of the disclosure. Each of the elements 305'''-360''' shown in FIG. 3D correspond to like-numbered elements 105-160 shown in FIG. 1B, which have been described previously. For example, primary reflector 335''' of FIG. 3D corresponds to primary reflector 135 of FIG. 1B, and so on. In FIG. 3D, lightguide 310''' has a rectangular cross-section.

Figure 6:
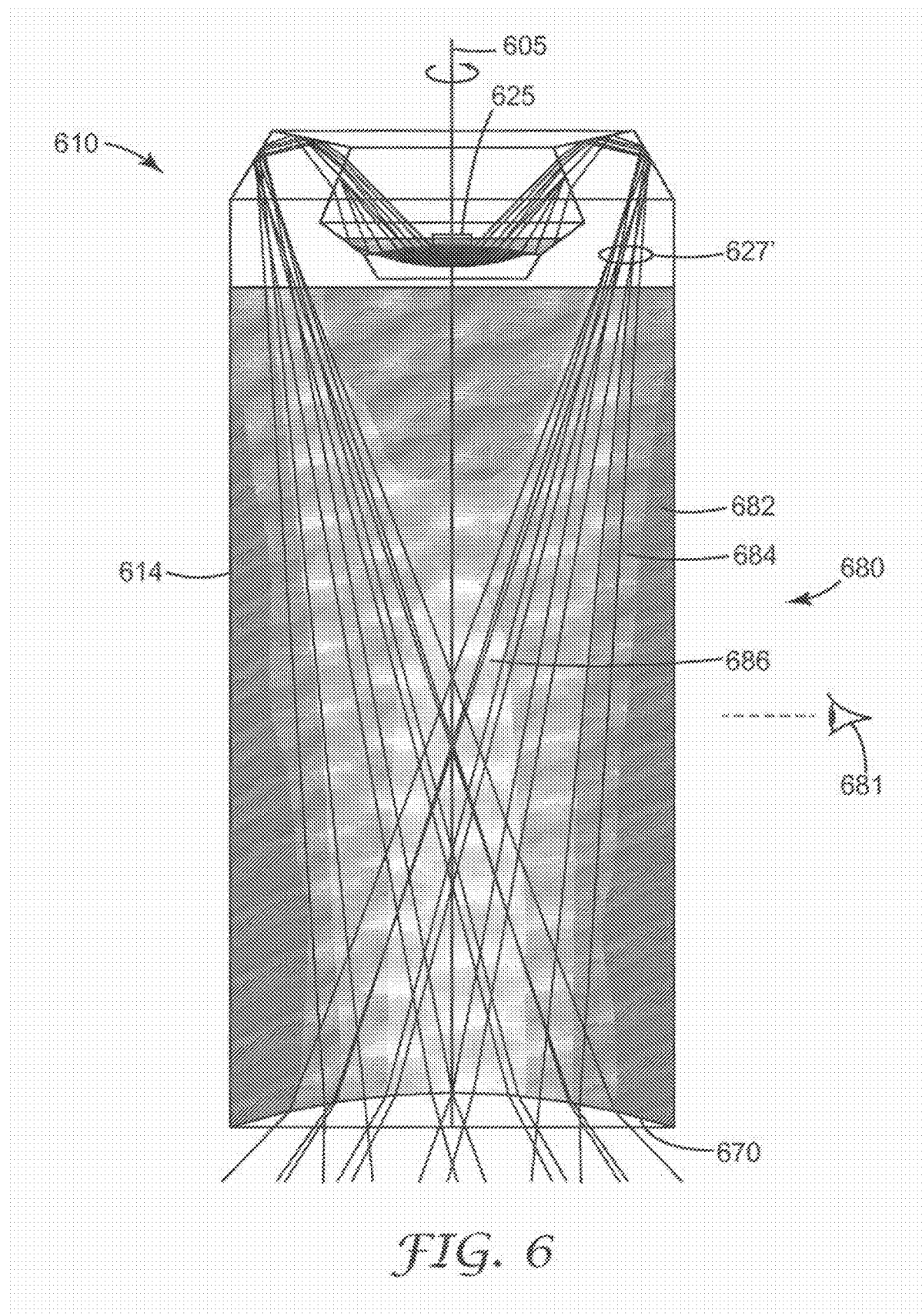
FIG. 6 shows a composite image of light rays passing through a lightguide.

Because the visible-light transmissive material used in the lightguide, such as, for example cast acrylic, can have some level of haze (typically ~5% haze per inch in thickness), the light rays traveling through the light fixture can be slightly scattered, revealing their pathway and generating a "floating" image. The region with higher energy density (i.e., more light rays passing through a unit volume) appears brighter. FIG. 6 shows a composite image of light rays passing through a lightguide 610, overlapped with a floating image 680 that can be visible when the lightguide is illuminated, according to one aspect of the disclosure. Each of the elements 605-670 shown in FIG. 6 correspond to like-numbered elements 105-170 shown in FIG. 1B, which have been described previously. For example, LED 625 of FIG. 6 corresponds to LED 125 of FIG. 1B, and so on. FIG. 6 shows a slice through the central axis 605 as viewed by an observer 681 looking toward and through the exterior surface 614 of lightguide 610.

A light beam 627' generated by reflection and/or refraction of light from LED 625 passes through lightguide 610. Light beam 627' can be symmetric, such as rotationally symmetric, about the central axis 605, or can have other distributions or symmetry, as described elsewhere regarding other optical elements within a lightguide. Several regions corresponding to different light scattering density can generate a floating image 680 within the lightguide. Floating image 680 includes darker first regions 682 where few of the light rays in light beam 627' pass through, lighter second regions 684 where more of the light rays in light beam 627' pass through, and even lighter third regions 686 where even more of the light rays in light beam 627' pass through. It is to be understood that there can be any number of discrete regions, and the description of the first, second, and third regions 682, 684, 686, are for illustrative reasons only. Generally, the transitions between each of the regions can be gradual; however, the sharpness of the transition between regions may be influenced by processing techniques and/or additives used while preparing the material of the lightguide 610. By changing the path of light rays through the lightguide, different floating images can be generated to provide ascetically appealing special effects.

EXAMPLE

A sample light fixture was made and tested. This example is merely for illustrative purposes only and is not meant to be limiting on the scope of the appended claims.

The lightguide was machined from a 63.5 mm diameter acrylic rod (Prototype Solution Group, Menomonie, Wis.). The surfaces were machined and polished. The lightguide used in this example was circularly symmetric and had a surface profile made of linear facets. The vertical cross-section was specified by the coordinates of the pivot points as illustrated in Table 1.

TABLE 1

| X (mm) | 18.77 | 14.63 | 25.90 | 31.75 | 31.75 | 0 | 0 | 10.73 | 12.87 |
|---|---|---|---|---|---|---|---|---|---|
| Z (mm) | −2.09 | −13.38 | −16.11 | −6.1 | 50 | 50 | 6.00 | 6.14 | 2.36 |

Figure 5:
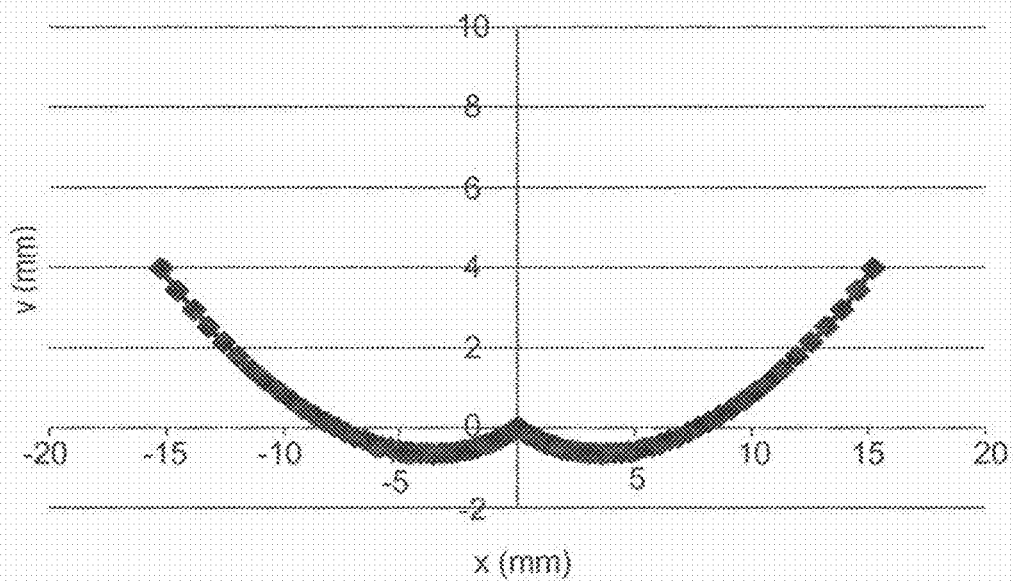
FIG. 5 shows a plot of points on an aspheric reflector.

The surface profile of the aspheric (i.e. primary) reflector was designed using a computer-assisted deterministic algorithm. Using an analogy of signal processing, the input was defined as the light ray distribution of the LED, the output was the desired light distribution, and the aspheric reflector resembled a linear response system. In this example, the desired light distribution was a ring distribution adjacent to the two reflective surfaces. The radius of the "ring" was set to be 18 mm, and the center of the ring was set to be 15 mm above (i.e., opposite side of the aspheric reflector) the LED center, and the center of the aspheric reflector was set to be 4 mm below the LED center. A point source was used as the light ray center in the algorithm, and the facet angle calculated at any point on the aspheric mirror to redirect the light ray to the perimeter of the "ring". The spatial coordinates of the points on the aspheric reflector are plotted in FIG. 5, in which x is the lateral axis and the LED center is at z=−4 mm.

The aspheric reflector was thermal formed Enhanced Specular Reflector (Vikuiti™ ESR film available from 3M Company, St. Paul, Minn.). In the thermal forming process, an aluminum tool shaped conjugate to the aspheric reflector was first machined. This tool was then used to press on a flat piece of ESR (sandwiched in between a 20 mil (0.51 mm) polycarbonate and a 7 mil (0.18 mm) polycarbonate substrate) in an oven of 350 C. The ESR on the plastic substrate changed shape following the contour of the aluminum tool. Finally the aspheric reflector was converted to the proper dimension using a mechanical punch. The LED used in the sample was a Cree XML easy white LED (flux group T4, Cree Inc. Durham, N.C.) with a color temperature of 2700K. The LED with its printed circuit board were attached to the bottom part of a two-part aluminum heat sink using thermal Epoxy (2810 epoxy available from 3M Company, St. Paul, Minn.), while the top part was attached to a hanging wire which also served as the electrical conducting wire for the LED.

The components were assembled within the cavity of the lightguide. In the assembly process, the aspheric reflector was first dropped into the cavity and was held in place by the cavity edges. The 2-piece heat sinks were then loosely linked together by 2 mounting screws. There were 2 wing-shaped locks (similar to those shown in FIG. 1D) mounted on the bottom part of the heat sink with hinges. When tilted downwards, these 2 wing locks fit through the open cavity. As the mounting screws are tightened, the wing locks were pressed outwards, and locked all the components in place. This configuration also allowed a user to replace components with minimal effort.

As described elsewhere, any surface element of the light fixture can have a curved or compound curved profile. In this example, the bottom surface of the housing unit was converted to a simple concave spherical curve with radius of 150 mm to control the light spreading angle.

Light Output Distribution

A photometric measurement system was used to evaluate the luminance output and the light distribution of the light fixture. The light fixture was hung at a height of 34.5 inches (87.6 cm measured from the bottom of the fixture) from a table. A light meter (Model EA33 EXTECH Waltham, Mass.) was used to measure the illuminance on the table. Because of the circular symmetry, the illuminance was only measured along a line through the center of the illumination area. The driving condition for the luminaire was 300 mA current and 11 V DC voltage. Under this driving condition, the luminance flux of the LED die was estimated to be 103 Lumen.

Figure 4:
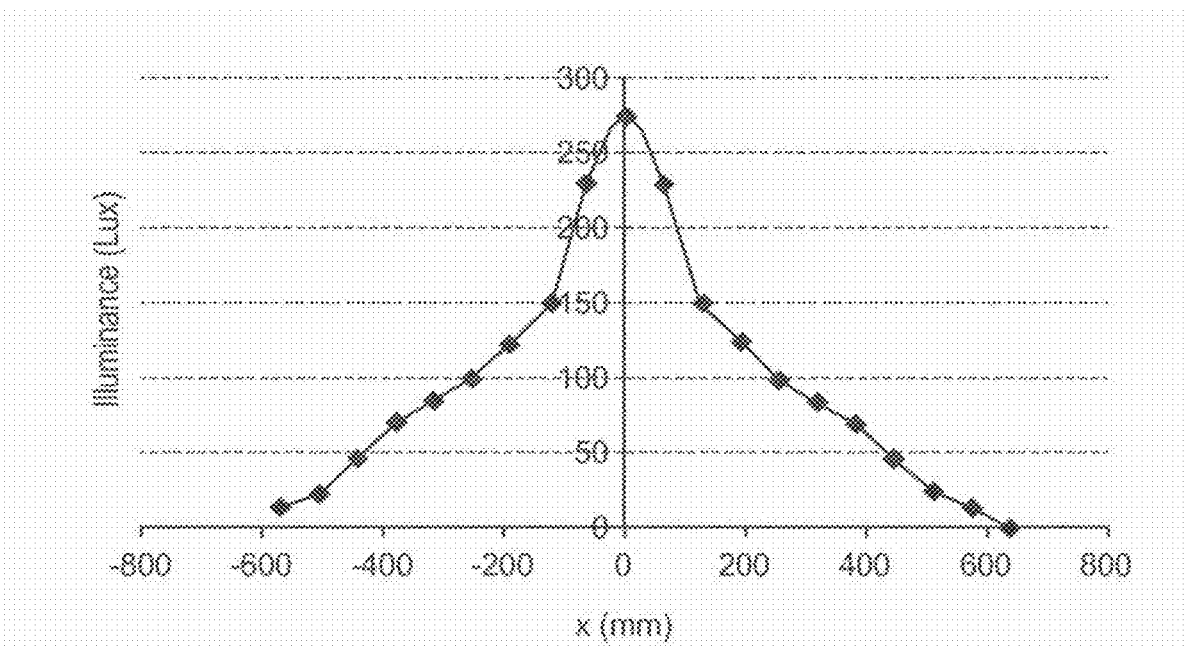
FIG. 4 shows a plot of illuminance vs. position.

The angular light distribution from the light fixture is quite well collimated and the majority of the light exited from the bottom of the fixture confined within an approximately 20 degree cone angle. The illuminance as a function of lateral position on the table is shown in FIG. 4. The spatial integration of the illuminance on the table gives a total luminance flux estimate of 72 Lumen, resulting in the overall down light luminance efficiency of about 70%.

Following are a list of embodiments of the present disclosure.

Item 1 is a light fixture, comprising: a lightguide having a top surface and an opposing bottom surface, the top surface comprising: a primary reflector cavity surrounding a central axis; an annular input surface disposed facing the primary reflector cavity; an annular first reflector surface adjacent the annular input surface; and a light source disposed along the central axis and adjacent a primary reflector within the primary reflector cavity, wherein light rays from the light source reflect from the primary reflector, refract through the annular input surface, reflect from the annular first reflector surface, and are directed toward the opposing bottom surface of the lightguide.

Item 2 is the light fixture of item 1, wherein the top surface further comprises an annular second reflector surface adjacent the annular first reflector surface, positioned such that light rays reflect from the annular second reflector surface before reaching the opposing bottom surface of the lightguide.

Item 3 is the light fixture of item 1 or item 2, wherein the light rays directed toward the opposing bottom surface comprises light rays travelling at an angle such that total internal reflection (TIR) occurs at an exterior surface disposed between the top surface and the opposing bottom surface.

Item 4 is the light fixture of item 1 to item 3, wherein the light rays directed toward the opposing bottom surface comprises light rays travelling at an angle within 60 degrees of the central axis.

Item 5 is the light fixture of item 1 to item 4, wherein the opposing bottom surface is an output surface comprising a lens, a plurality of facets, a diffuser, or a combination thereof.

Item 6 is the light fixture of item 1 to item 5, wherein the annular first reflector surface comprises a polished surface capable of total internal reflection (TIR).

Item 7 is the light fixture of claim 2 to item 6, wherein the annular second reflector surface comprises a polished surface capable of total internal reflection TIR.

Item 8 is the light fixture of item 1 to item 7, wherein the primary reflector comprises a shaped reflective film.

Item 9 is the light fixture of item 8, wherein the shaped reflective film comprises thermoformed polymeric multi-layer optical film.

Item 10 is the light fixture of item 1 to item 9, wherein the primary reflector comprises an aspherical reflector.

Item 11 is the light fixture of item 1 to item 10, wherein the primary reflector comprises a cusp-shaped reflector.

Item 12 is the light fixture of item 1 to item 11, wherein the lightguide is symmetric around the central axis.

Item 13 is the light fixture of item 1 to item 12, wherein the lightguide is rotationally symmetric around the central axis.

Item 14 is the light fixture of item 1 to item 13, wherein the lightguide comprises a solid cylinder or a hollow cylinder.

Item 15 is the light fixture of item 1 to item 14, wherein the light source comprises a light emitting diode (LED).

Item 16 is the light fixture of item 1 to item 15, wherein the light source comprises a heat sink disposed exterior to the primary reflector cavity.

Item 17 is the light fixture of item 1 to item 16, further comprising an expandable latch to releasably attach the light source to the lightguide.

Item 18 is the light fixture of item 1 to item 17, wherein the light rays from the light source reflect from the primary reflector toward a virtual annular focus positioned opposite the annular input surface.

Item 19 is the light fixture of item 1 to item 18, wherein each of the primary reflector, the annular input surface, and the annular first reflector surface independently comprises a surface generated by rotating around the central axis a line, a piecewise line, a curve, or a piecewise curve.

Item 20 is the light fixture of item 2 to item 19, wherein the annular second reflector surface comprises a surface generated by rotating around the central axis a line, a piecewise line, a curve, or a piecewise curve.

Item 21 is the light fixture of item 1 to item 20, wherein the lightguide comprises a visible-light transmissive material including a plastic, a mineral, or a glass.

Item 22 is a light fixture, comprising: a lightguide having a top surface and an opposing bottom surface, the top surface comprising: a primary reflector cavity surrounding a central axis; an annular first reflector disposed facing the primary reflector cavity; and a light source disposed along the central axis and adjacent a primary reflector within the primary reflector cavity, wherein light rays from the light source reflect from the primary reflector, reflect from the annular first reflector, and are directed toward the opposing bottom surface of the lightguide.

Item 23 is the light fixture of item 22, wherein the top surface further comprises an annular second reflector adjacent the annular first reflector, positioned such that light rays reflect from the annular second reflector before reaching the opposing bottom surface of the lightguide.

Item 24 is the light fixture of item 22 or item 23, wherein the light rays directed toward the opposing bottom surface comprises light rays travelling at an angle such that total internal reflection (TIR) occurs at an exterior surface disposed between the top surface and the opposing bottom surface.

Item 25 is the light fixture of item 22 to item 24, wherein the light rays directed toward the opposing bottom surface comprises light rays travelling at an angle within 60 degrees of the central axis.

Item 26 is the light fixture of item 22 to item 25, wherein the opposing bottom surface is an output surface comprising a lens, a plurality of facets, a diffuser, or a combination thereof.

Item 27 is the light fixture of item 22 to item 26, wherein the annular first reflector comprises a metal, a metal alloy, or a dielectric reflector.

Item 28 is the light fixture of item 23 to item 27, wherein the annular second reflector comprises a metal, a metal alloy, or a dielectric reflector.

Item 29 is the light fixture of item 22 to item 28, wherein the primary reflector comprises a shaped reflective film.

Item 30 is the light fixture of item 29, wherein the shaped reflective film comprises thermoformed polymeric multi-layer optical film.

Item 31 is the light fixture of item 22 to item 30, wherein the primary reflector comprises an aspherical reflector.

Item 32 is the light fixture of item 22 to item 31, wherein the primary reflector comprises a cusp-shaped reflector.

Item 33 is the light fixture of item 22 to item 32, wherein the lightguide is symmetric around the central axis.

Item 34 is the light fixture of item 22 to item 33, wherein the lightguide is rotationally symmetric around the central axis.

Item 35 is the light fixture of item 22 to item 34, wherein the lightguide comprises a solid cylinder or a hollow cylinder.

Item 36 is the light fixture of item 22 to item 35, wherein the light source comprises a light emitting diode (LED).

Item 37 is the light fixture of item 22 to item 36, wherein the light source comprises a heat sink disposed exterior to the primary reflector cavity.

Item 38 is the light fixture of item 22 to item 37, further comprising an expandable latch to releasably attach the light source to the lightguide.

Item 39 is the light fixture of item 22 to item 38, wherein the light rays from the light source reflect from the primary reflector toward a virtual annular focus positioned opposite the annular first reflector surface.

Item 40 is the light fixture of item 22 to item 39, wherein each of the primary reflector and the annular first reflector independently comprises a surface generated by rotating around the central axis a line, a piecewise line, a curve, or a piecewise curve.

Item 41 is the light fixture of item 23 to item 40, wherein the annular second reflector comprises a surface generated by rotating around the central axis a line, a piecewise line, a curve, or a piecewise curve.

Item 42 is the light fixture of item 22 to item 41, wherein the lightguide comprises a visible-light transmissive material including a plastic, a mineral, or a glass.

Item 43 is the light fixture of item 1 to item 42, wherein the primary reflector is concave to the light source.

Any of the various light fixture designs shown herein can incorporate any of the described opposing bottom surfaces, annular input surfaces, primary reflectors, cross-sections, annular reflective surfaces, and the like.

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A light fixture, comprising:
a lightguide having a top surface and an opposing bottom surface, the top surface comprising:
a primary reflector cavity surrounding a central axis;
an annular input surface disposed facing the primary reflector cavity;
an annular first reflector surface adjacent the annular input surface; and
a light source disposed along the central axis and adjacent a primary reflector within the primary reflector cavity, wherein light rays from the light source reflect from the primary reflector, refract through the annular input surface, reflect from the annular first reflector surface, and are directed toward the opposing bottom surface of the lightguide.

2. The light fixture of claim 1, wherein the top surface further comprises an annular second reflector surface adjacent the annular first reflector surface, positioned such that light rays reflect from the annular second reflector surface before reaching the opposing bottom surface of the lightguide.

3. The light fixture of claim 1, wherein the light rays directed toward the opposing bottom surface comprises light rays travelling at an angle such that total internal reflection (TIR) occurs at an exterior surface disposed between the top surface and the opposing bottom surface.

4. The light fixture of claim 1, wherein the light rays directed toward the opposing bottom surface comprises light rays travelling at an angle within 60 degrees of the central axis.

5. The light fixture of claim 1, wherein the opposing bottom surface is an output surface comprising a lens, a plurality of facets, a diffuser, or a combination thereof.

6. The light fixture of claim 1, wherein the annular first reflector surface comprises a polished surface capable of total internal reflection (TIR).

7. The light fixture of claim 1, wherein the primary reflector comprises a shaped reflective film.

8. The light fixture of claim 1, wherein the primary reflector comprises an aspherical reflector or a cusp-shaped reflector.

9. The light fixture of claim 1, wherein the lightguide is symmetric around the central axis.

10. The light fixture of claim 1, wherein the lightguide comprises a solid cylinder or a hollow cylinder.

11. The light fixture of claim 1, wherein the light source comprises a light emitting diode (LED).

12. The light fixture of claim 1, wherein the light source comprises a heat sink disposed exterior to the primary reflector cavity.

13. The light fixture of claim 1, wherein the light rays from the light source reflect from the primary reflector toward a virtual annular focus positioned opposite the annular input surface.

14. The light fixture of claim 1, wherein each of the primary reflector, the annular input surface, and the annular first reflector surface independently comprises a surface generated by rotating around the central axis a line, a piecewise line, a curve, or a piecewise curve.

* * * * *